United States Patent [19]

Perrin et al.

[11] Patent Number: 5,609,966
[45] Date of Patent: Mar. 11, 1997

[54] SHEET PRODUCED BY A PAPERMAKING TECHNIQUE FOR ABRASION-RESISTANT LAMINATES

[75] Inventors: Claude Perrin, Apprieu; Pierre Caulet, Voiron, both of France

[73] Assignee: Arjo Wiggins S.A., France

[21] Appl. No.: 351,129

[22] Filed: Nov. 30, 1994

[30] Foreign Application Priority Data

Dec. 2, 1993 [FR] France .................................. 93 14441

[51] Int. Cl.$^6$ ...................................................... B32B 21/06
[52] U.S. Cl. ........................ 428/535; 428/531; 428/537.5; 264/258
[58] Field of Search .................................. 428/290, 531, 428/535, 537.5; 264/258

[56] References Cited

U.S. PATENT DOCUMENTS

| | | | |
|---|---|---|---|
| 3,952,130 | 4/1976 | Nason | 428/332 |
| 4,210,692 | 7/1980 | Bohme et al. | 428/106 |
| 4,872,952 | 10/1989 | Alsterhäll | 162/152 |

FOREIGN PATENT DOCUMENTS

| | | |
|---|---|---|
| 078424A2 | 10/1982 | European Pat. Off. . |
| 430770A1 | 11/1990 | European Pat. Off. . |
| 53-145890 | 12/1978 | Japan . |

*Primary Examiner*—Christopher Raimund
*Attorney, Agent, or Firm*—Bacon & Thomas

[57] ABSTRACT

The invention relates to a surface sheet produced by the papermaking method used in the production of abrasion-resistant laminates comprising glass wool fibers. According to the invention, the sheet comprises, before impregnation with thermosetting resin, up to about 7% by dry weight of glass wool fibers with respect to its total dry weight. The invention finds an application as protective covering sheet called overlay and as decorative sheet.

16 Claims, No Drawings

SHEET PRODUCED BY A PAPERMAKING TECHNIQUE FOR ABRASION-RESISTANT LAMINATES

FIELD OF THE INVENTION

The present invention relates to a surface sheet produced by a papermaking technique used in the production of laminated paper, said sheet increasing the resistance to abrasion of such paper.

BACKGROUND OF THE INVENTION

Mainly, there are two types of laminated panels: so-called high pressure panels and low pressure panels.

For many years now, laminates have been used as materials for dwellings and industrial and commercial buildings. Typical applications of such laminates are for covering the surfaces of furniture, table tops, chairs and the like. Consequently, they are subjected to much friction and to abrasion; and therefore, they are required to have a high resistance to abrasion.

The so-called high pressure laminates are produced from a core which is constituted of resin-impregnated sheets. Said sheets are generally sheets of kraft paper: which have been impregnated with a thermosetting resin and more particularly a phenolic resin.

Once the sheets have been impregnated with resin, they are dried, cut and stacked one over the other. The number of sheets in the stack varies with the applications and may be between 3 and 9, and even more.

Then a decorative sheet is placed over the stack of sheets constituting the core. Said decorative sheet is generally a sheet of paper carrying a printed or colored pattern, or comprising decorative particles, said sheet being impregnated with a thermosetting resin which does not blacken under heat, such as for example melamine formaldehyde resins, benzoguanamine formaldehyde resins, non-saturated polyester resins. Normally, a protective covering sheet without any pattern and which remains transparent in the final laminates, is placed over the decorative sheet. In the trade, said protective sheet is called overlay. The stack of impregnated sheets is then placed inside a press equipped with a metal plate conferring the surface finish. Then the stack is densified by heating and pressing to obtain a uniform structure.

The so-called low pressure laminates are produced in the same way as the high pressure laminates, except that the decorative sheet is directly laminated onto a panel of wood particles or any other supporting base.

The protective sheet or overlay is conventionally produced by draining an aqueous suspension of virtually non-refined cellulose fibers. Said sheet has a low basis weight and is not opacified. It is impregnated with thermosetting resin, which makes it transparent in the final laminate and reveals the decorative pattern of the latter.

Said overlay sheet protects the surface of the laminate, and in particular it increases its resistance to abrasion through an extra intake of thermosetting resin.

This is the most common way to increase the resistance to abrasion of laminates.

This resistance, however, can be further increased by using abrasive particles in or on the overlay or on the decorative sheet proper.

For example, patents FR-A-2 104 707, FR-A-2 139 990, U.S. Pat. No. 3,661,673, U.S. Pat. No. 5,141,799 and CA 836522 have described the use of particles, hence of near-spherical shape, of alumina also known as corundum, of silica, of boron carbide or of silicon, titanium or tungsten.

Said particles may be incorporated in bulk or placed on the surface of the sheet or even deposited on the resin-impregnated sheet.

Said particles present two disadvantages which are that, on the one hand they cause premature wearing out of the machines on which are produced the protective sheets containing them, and of the laminating presses, and that on the other hand, the bonding of said particles in or on the sheets is not easy due to the fact that either they are difficult to keep in bulk or they show poor adherence to a surface.

To overcome said disadvantages it is conceivable to use abrasion-resistant fibers which, because of their fibrous nature, should be more readily integratable with the cellulose fibers.

However, Patent GB-A-1 201 071, filed in 1967, reports in its description of the prior art that the incorporation of glassfibers in a protective sheet with a view to improving the resistance to abrasion of laminates, has not given satisfactory results, particularly as the fibers have been found to affect the appearance of the laminate.

The comparative examples described hereinafter have indeed confirmed that said fibers remain visible in the sheets after impregnation.

Said examples further reveal that the glassfibers used in ground form give erratic results.

As shown in the already cited patents, this idea has since been abandoned and all the research has been directed to the use of particles, hence of rounded form, and more or less abrasive, and to the various methods of incorporating them, in or on the protective sheet or the decorative sheet.

SUMMARY OF THE INVENTION

Contrary to current research, undertaken over 25 years ago, and therefore contrary to the knowledge of the man skilled in the art, the inventors have sought to use fibers and have found that the resistance to abrasion of laminates can be further improved by using a surface sheet which contains glassfibers, without having the aforesaid disadvantages if said fibers are incorporated in the form of wool.

It is therefore the object of the present invention to provide a surface sheet produced by a papermaking technique and usable in the production of abrasion-resistant laminates, and which is characterized in that it comprises glass wool.

According to Examples 6 to 8, the resistance to abrasion of the laminates ceases to increase for a glass wool content of over about 7% by dry weight with respect to the total dry weight of the sheet before impregnation, as indicated in the RESULTS from the examples.

It is therefore unnecessary to use more glass wool. Also, if the sheet is intended to be used as a printed decorative sheet, it is preferable not to use too much glass wool as this could wrongly affect the printability.

Therefore, the sheet according to the invention is more particularly characterized by the fact that it comprises, before being impregnated with thermosetting resin, up to about 7% by dry weight of glass wool with respect to its total dry weight.

The invention further relates to the sheet impregnated with a thermosetting resin.

The sheet according to the invention may be used as a protective coveting sheet called overlay. Said sheet is placed over the decorative sheet of the laminate.

As a variant, the sheet according to the invention can be used directly as a decorative sheet.

The sheet according to the invention is obtained by a papermaking technique, from an aqueous solution based on cellulose fibers, the glass wool being added to the cellulose fibers; the composition preferably contains a moisture-resistant agent. In the case of a sheet intended for decoration, the composition may comprise opacifying or coloring pigments.

The sheet may also be constituted of a plurality of webs, the upper web containing the glass wool.

Another object of the invention is an abrasion-resistant laminate which is characterized by the fact that it comprises a sheet according to the invention as overlay.

Yet another object of the invention is an abrasion-resistant sheet which is characterized in that it comprises a sheet according to the invention as decorative sheet.

As a variant, the laminate may comprise a sheet according to the invention as decorative sheet with a conventional overlay, containing no glass wool, to obtain a higher resistance to abrasion.

As another variant, the laminate may comprise a decorative sheet and an overlay which are both according to the invention, for an even higher resistance to abrasion. Therefore the inventors claim in one particular embodiment of the invention, an abrasion-resistant laminate which is characterized by the fact that its overlay and its decorative sheet are both sheets according to the invention.

EXAMPLES OF PREFERRED EMBODIMENTS

The invention will be more readily understood on reading the following non-restrictive examples.

REFERENCE EXAMPLES 1 AND 2

Two conventional overlay sheets are produced on a Fourdrinier type papermaking machine from a composition in aqueous medium of cellulose fibers refined to 20 SR (SCHOEPPER-RIEGLER degrees) and containing 2% by dry weight of a moisture-resistant agent based on melamine formaldehyde resin.

After drying, the sheets have in Example 1 and Example 2, respectively, a basis weight of 32.5 and 41 g/m$^2$.

The GURLEY porosity (Norm ISO 5636-5) of a stack of 5 sheets is measured so as to keep within a range which can be measured with the apparatus.

The capillary rise is measured for one sheet, according to KLEMM's method (Norm ISO 08-787) for a period of 10 minutes. The rate of ashes is determined according to the Norm ISO 2144 (1987) at 420° C.

Each sheet is impregnated with a melamine-formaldehyde resin in aqueous medium, the impregnation rate being 65%, which means that them are about 65 grams of resin by dry weight for 100 grams of impregnated paper.

Said sheet is laminated to produce a high pressure laminate according to the following method and operational conditions:

5 sheets of kraft paper impregnated with phenolic resin followed by one printed decorative sheet, impregnated with melamine formaldehyde resin are stacked one over the other, and finally the impregnated overlay sheet is placed over the stack.

The plates of the laminating press are heated to 160° C. and a pressure of 6.9 MPa (70 kg/cm$^2$) is applied for 30 minutes.

The resistance to abrasion of the obtained laminate is measured according to the Norm NF-EN 438-2 (1991) paragraph 6.

EXAMPLES WITH CONVENTIONAL GLASSFIBERS

Overlay sheets are produced as indicated in the reference examples except that x parts by dry weight of glassfibers (x being equal to 5 or 10) are added for 100 parts of cellulose fibers.

Two different Fades of glassfibers are used, one corresponding to fibers having a mean length of 4.5 mm and a mean diameter of 10 μm, the other corresponding to fibers having a mean length of 4.5 mm and a mean diameter of 14 μm. Said fibers are introduced either before or after refining.

The sheets are impregnated as in the reference examples.

The sheets are laminated as indicated in reference examples 1 and 2.

In all cases, it is found that, after lamination, the glassfibers are visible on the surface of the laminate, whether said fibers were introduced before or after refining, therefore whether or not they were ground during refining and whatever their content in the paper.

Therefore, the conventional glassfibers should not be used since they blur the decoration of the laminate.

EXAMPLES 3 TO 5 WITH PRE-GROUND GLASSFIBERS

An overlay sheet is produced as indicated in the reference examples except that x parts by dry weight of pre-ground glassfibers are added for every 100 parts of cellulose fibers (x being equal to 3, 9 or 14).

Said fibers are added to the chest of the paper machine.

The glassfibers used have a mean diameter of 10 μm and a mean length of 0.27 mm.

The sheets are impregnated as in the reference examples.

The sheets are laminated as in reference examples 1 and 2.

No blurting is observed after lamination but the results obtained regarding the resistance to abrasion are irregular (see Table hereinafter).

EXAMPLES 6 TO 9 WITH GLASS WOOL

As indicated hereinabove, x parts by dry weight of glass wool are added for 100 parts of cellulose fibers (x being equal to 3, 9 or 14).

Two different grades of glass wool are used:

in examples 6 to 8, the glass wool used has fibers of mean length 0.7 mm and of mean diameter 10 μm, in example 9, the glass wool used has fibers of mean length 6 mm and of mean diameter 4 μm (the histogram of the diameters ranges from 1 to 20 μm).

The impregnation and lamination of the sheets is performed as in the reference examples.

A good transparency of the sheets is observed, and the decorations have not been altered by the overlay sheet.

RESULTS

The results given in the following Table show that:

for an identical rate of impregnation with resin and for an identical basis weight (comparing examples 2 and 6), a sheet according to the invention for which 3 parts of glass wool have been introduced for 100 parts of cellulose fibers, has its resistance to abrasion increased of 50 revs compared with a sheet containing no glass wool;

the level of resistance of a sheet according to the invention for which 3 parts of glass wool have been introduced for 100 parts of cellulose fibers, and whose basis weight is 32 g/m$^2$ (example 6) is slightly higher than that of a sheet containing no glass wool and having a basis weight of 41 g/m$^2$ (example 1), which means that a sheet with a lower basis weight, hence using less thermosetting resin, can be used to obtain a given level of resistance to abrasion;

the level of resistance to abrasion is identical in examples 7 and 8, this level is therefore maximum for a glass wool content of about 7% by dry weight with respect to the total weight of the sheet of paper before impregnation. Indeed, 9 parts of glass wool correspond to a rate of ashes at 420° C. of 7.4%, this rate of ashes comprising the glass wool and the residue from the cellulose pulp, or according to the reference sheet of example 2 with a similar basis weight, the residue from the cellulose pulp is at most 0.4%, hence an approximate glass wool content of 7% in the final paper before impregnation.

TABLE

| example | 1 | 2 | 3 | 4 | 5 | 6 | 7 | 8 | 9 |
|---|---|---|---|---|---|---|---|---|---|
| x parts | 0 | 0 | 3 | 9 | 14 | 3 | 9 | 14 | 3 |
| basis weight (g/m$^2$) | 41 | 32.5 | 32.8 | 32.7 | 32.2 | 33 | 32.5 | 33.6 | 32 |
| quire (cm$^3$/g) | 1.85 | 1.96 | 2.01 | 1.98 | 2.05 | 2.03 | 2.11 | 2.13 | 2.37 |
| Gurley porosity (s/100 cm3 of air) | 10.7 | 6.4 | 4.4 | 3.8 | 3.2 | 5.2 | 3 | 2.8 | 3.3 |
| capillary rise 10 mn (mn) | 56 | 34 | 52 | 41 | 42 | 35 | 62 | 48 | 46 |
| Rate of ashes (%) | 0.7 | 0.4 | 1.2 | 5.9 | 8.6 | 2.9 | 7.4 | 10.7 | 3 |
| resistance to abrasion (revs) | 450 | 400 | 450 | 400 | 450 | 450 | 500 | 500 | 450 |

What is claimed is:

1. An abrasion-resistant laminate comprising a plurality of resin impregnated paper sheets and a protective covering overlay sheet, wherein the overlay sheet is produced by a papermaking technique and is comprised of glass wool fibers and cellulose fibers.

2. An abrasion-resistant laminate comprising a plurality of resin impregnated paper sheets and a decorative sheet, wherein the decorative sheet is produced by a papermaking technique and is comprised of glass wool fibers and cellulose fibers.

3. An abrasion-resistant laminate comprising a plurality of resin impregnated paper sheets, a decorative sheet and a protective covering overlay sheet, wherein the overlay sheet and the decorative sheet are produced by a papermaking technique and are comprised of glass wool fibers and cellulose fibers.

4. An abrasion-resistant laminate comprising a plurality of resin impregnated paper sheets and a surface layer, wherein the surface layer comprises a surface sheet that is produced by a papermaking technique, said surface sheet comprising glass wool fibers in an amount of up to 7% by dry weight of the surface sheet and cellulose fibers.

5. The abrasion-resistant laminate of claim 4, wherein the surface sheet is impregnated with thermosetting resin.

6. The abrasion-resistant laminate according to claim 1, wherein the glass wool fibers are present in an amount of up to 7% by dry weight of the protective overlay sheet.

7. The abrasion-resistant laminate according to claim 2, wherein the glass wool fibers are present in an amount up to 7% by dry weight of the decorative sheet.

8. The abrasion-resistant laminate according to claim 3, wherein the glass wool fibers are present in an amount of up to 7% by dry weight of each of the decorative and protective overlay sheets.

9. The abrasion-resistant laminate according to claim 1, wherein the protective covering overlay sheet is impregnated with a thermosetting resin.

10. The abrasion-resistant laminate according to claim 2, wherein the decorative sheet is impregnated with thermosetting resin.

11. The abrasion-resistant laminate according to claim 3, wherein the decorative and protective overlay sheets are impregnated with thermosetting resin.

12. The abrasion-resistant laminate of claim 7, wherein the decorative sheet further comprises a pigment selected from the group consisting of opacifying pigments and coloring pigments.

13. The abrasion-resistant laminate of claim 4, wherein the surface sheets and wherein said surface sheet forms the outer layer of the laminate.

14. A method for producing an abrasion-resistant laminate comprising the steps of:
   (a) producing a surface sheet comprising glass wool fibers and cellulose fibers by a papermaking technique;
   (b) drying the surface sheet;
   (c) impregnating the surface sheet with a thermosetting resin;
   (d) forming a stack of multiple sheets of Kraft paper impregnated with a thermosetting resin, a printed decorative sheet, and the impregnated surface sheet; and
   (e) applying heat and pressure to the stack to form the abrasion resistant laminate.

15. The method according to claim 14, wherein in step (a) the glass wool fibers are present in an amount of up to about 7% by dry weight of the surface sheet.

16. The method according to claim 14, wherein the decorative sheet is impregnated with thermosetting resin.

* * * * *